United States Patent [19]

Finney

[11] 4,105,266
[45] Aug. 8, 1978

[54] LAMINATED BEARING WITH PLURAL MODULUS LAYER

[75] Inventor: Robert H. Finney, Erie, Pa.

[73] Assignee: Lord Corporation, Erie, Pa.

[21] Appl. No.: 821,003

[22] Filed: Aug. 1, 1977

Related U.S. Application Data

[63] Continuation-in-part of Ser. No. 632,423, Nov. 17, 1975, Pat. No. 4,040,690.

[51] Int. Cl.² ............................................. F16C 27/06
[52] U.S. Cl. ............................. 308/237 R; 267/152; 308/26; 416/134 A
[58] Field of Search ............... 308/237 A, 237 R, 238, 308/2 R, 2 A, 26; 416/134; 248/24, 22, 188.8; 267/152, 63, 57.1; 260/141

[56] References Cited

U.S. PATENT DOCUMENTS

| | | | |
|---|---|---|---|
| 2,127,219 | 8/1938 | Hirshfeld | 267/63 R |
| 2,560,627 | 7/1951 | Boschi | 267/63 R |
| 3,071,422 | 1/1963 | Hinks | 308/237 R |
| 3,179,400 | 4/1965 | Krotz | 267/57.1 |
| 3,544,415 | 12/1970 | Price et al. | 248/22 X |
| 3,941,433 | 3/1976 | Dolling et al. | 308/2 R |

Primary Examiner—Trygve M. Blix
Assistant Examiner—Douglas C. Butler

Attorney, Agent, or Firm—Maurice R. Salada; James W. Wright

[57] ABSTRACT

A laminated bearing comprises a plurality of alternating and bonded together annular layers of elastomeric material and non-extensible material. The layers alternate along a common axis extending lengthwise of the bearing so that the bearing can support substantial compressive loads applied generally normal to the layers. The layers include at least one elastomeric layer which, if formed to have a nominally constant modulus of elasticity throughout and if subjected to a compressive load, would experience a shear strain adjacent one of its inner and outer circumferences greater than the shear strain adjacent the other circumference. Such a difference in compression-induced shear strains would tend to cause uneven wearing of and a reduced service life for the elastomeric layer in question and for the bearing as a whole. To avoid or minimize uneven wear, the elastomeric layer is formed to have at least two different moduli of elasticity. The nominal modulus of the layer is higher or highest adjacent the circumference of the layer which tends to experience the higher compression-induced shear strain. As a result, the ratio between the shear strains adjacent the two circumferences of the layer is less than what it would be if the layer had a nominally constant modulus of elasticity throughout.

7 Claims, 8 Drawing Figures

LAMINATED BEARING WITH PLURAL MODULUS LAYER

This is a continuation-in-part of application Ser. No. 632,423, filed Nov. 17, 1975, now U.S. Pat. No. 4,040,690.

BACKGROUND OF THE INVENTION

The compressive load carrying capacity of a layer of resilient material may be increased several hundred percent by incorporating a plurality of spaced, parallel laminae fabricated of nonextensible material and oriented generally perpendicular to the direction of the anticipated compressive load. The laminae increase the compressive load carrying capacity of the resilient material by reducing the ability of the material to deflect or bulge in directions transverse to the direction of the compressive load. At the same time, the ability of the material to yield in shear or torsion in directions parallel to the laminations or transverse to the direction of the compressive load is substantially unaffected. The characteristics of such a laminated resilient material have resulted in the commercial acceptance for a variety of applications of bearings incorporating the material. One area of particular importance is the mounting of helicopter rotor blades on an associated rotor hub.

In a typical mounting system for the blades of a helicopter rotor, as shown for example in Rybicki et al U.S. Pat. No. 3,829,239, each rotor blade is secured to a rotor hub by two serially arranged laminated bearings. One laminated bearing, which has annular, disc-shaped laminations, resists the centrifugal load on the rotor blade and permits oscillatory pitch-change movements of the blade about its longitudinal axis. The other bearing, which has annular, spherically-shaped laminations, also resists the centrifugal load on the rotor blade and accommodates pitch-change, flapping and lead-lag movements of the blade. Since the pitch-change rotations of the blade are of a relatively large magnitude (i.e. 10° to 15° in each rotational direction), particularly when compared to the lead-lag and flapping motions, the combined torsional movement capabilities of the two laminated bearings must be relatively large. For economic and space reasons, the bearing having disc-shaped laminations is conventionally designed to accommodate a greater proportion of the torsional motion. As a result, the disc-type or thrust bearing is relatively long or tall. With increasing length or height, however, the bearing becomes increasingly unstable in a lateral or radial direction.

The lateral instability associated with a tall or long laminated bearing has been recognized and various proposals have been made to counter the instability. One such proposal is to modify the disc-like configuration of the laminations in the bearing so as to resist the lateral movements of individual laminations which result in buckling of the bearing. Representative configurations providing lateral stability are described and illustrated in Hinks et al U.S. Pat. No. 3,083,065 and Peterson U.S. Pat. No. 3,292,711. Bearings having laminations configured to resemble the laminations of the bearing shown in FIGS. 2 and 6 of the Peterson 3,292,711 patent have been utilized successfully in helicopter rotor blade retention systems. Nonetheless, as technology in the construction of helicopters has advanced, increased demands, in terms of higher centrifugal loads and prolonged service life, have been made on laminated bearings utilized in helicopters. Laminated bearings having laminations shaped generally as shown in the Peterson 3,292,711 patent, and, more specifically, as shown in FIGS. 2 and 3 of Johnson U.S. Pat. No. 3,807,896 and in FIGS. 1(b) and 3 of an article entitled "Elastomeric Bearing Application to Helicopter Tail Rotor Designs", authored by C. H. Fagan and appearing in the *Journal of the American Helicopter Society*, Volume 13, No. 4 (October 1968), have been unable to satisfy increased service life requirements. Such bearings have characteristically failed through failure and extrusion of the elastomeric laminations adjacent to each end of the bearing.

As more fully discussed in copending application Ser. No. 632,423, filed Nov. 17, 1975, now U.S. Pat. No. 4,040,690, it has been found that when large compressive loads are applied to a laminated bearing in which the layers are contoured to provide lateral stability, the contour of the layers may contribute to unusually large strains in the elastomeric layers adjacent an end of the bearing toward which all or a part of each layer projects. The excessive strains tend to cause early fatigue failure of the layers and to reduce the service life of the bearing. To accommodate the high stresses occurring in the elastomeric layers without introducing excessive strains, the layers of elastomeric material in a central lengthwise portion of a bearing according to the invention of application Ser. No. 632,423 have smaller compression moduli than the layers of elastomeric material adjacent the end of the bearing toward which the layers project. While the compressive stresses on the elastomeric layers are not reduced, the high compression-induced strains are substantially reduced and the life of the bearing is correspondingly increased. In a preferred embodiment, the elastomeric layers along the length of the bearing between the central lengthwise portion of the bearing and the end of the bearing toward which the layers project have progressively increasing compression moduli with increasing distance from the central portion of the bearing.

The invention of application Ser. No. 632,423 largely overcomes a significant problem that previously limited the fatigue life of certain laminated elastomeric bearings. The gradation or variation of compression moduli from one elastomeric layer to another in a laminated bearing not only reduces excessive strains in critical elastomeric layers, it can also minimize or eliminate all variations in compression induced shear strains at corresponding points on successive layers. The more uniform the compression induced shear strains become, the less likely it is that any elastomeric layer will fail in fatigue significantly sooner than the other elastomeric layers. By the same token, the more uniform the compression induced shear strains are within each layer, the less likely it is that any portion of any elastomeric layer will fail in fatigue before any other portion of the layer. Absolute uniformity of compression induced shear strains within a layer of elastomer is impossible to achieve because the strains necessarily decrease from some finite value adjacent each unconfined edge of the layer to zero at some point in the interior of the layer. Nonetheless, a more uniform wearing and fatiguing of each layer can be achieved by causing the compression induced shear strains adjacent the edges of the layer, which are normally the largest strains in the layer, to become more nearly equal to one another. The invention that is defined by the claims of application Ser. No. 632,423 is not directed to reducing variations between the compression induced shear strains developed at various points within a layer of elastomer. The application does recognize, however, that the compression induced shear strains adjacent the inner and outer circumferences of an annular elastomeric layer, for example, will often be significantly different. The difference in strains is recognized at page 10, lines 5 to 21 and at page 17, line 27 to page 18, line 19 of the application. At page 18, lines 17 to 19, a proposal is made to grade or vary the modulus of elasticity of an elastomeric layer in a radial direction within the layer. Although the proposal is made with respect to only one particularly configured laminated bearing, the proposal has more general applicability in terms of minimizing the variations in compression induced shear strain within an elastomeric layer or lamination of a laminated bearing.

Gradation or variation of the modulus of elasticity within an elastomeric layer of a laminated bearing is not unknown. Dolling et al. U.S. Pat. No. 3,941,433 describes and illustrates a laminated elastomeric bearing in which each annular elastomeric layer or lamination has a central annular portion of soft or low modulus elastomer. Two annular edge or peripheral portions of each layer are fabricated of stiffer or higher modulus elastomer in order to contain the softer central portion of the layer. The patent does not identify the problem of different compression induced strains within a layer of elastomer, nor does the gradation of the layers of the Dolling et al bearing offer a solution to the problem. Boschi U.S. Pat. No. 2,560,627 describes and illustrates a laminated elastomeric support that incorporates a lateral gradation of stiffnesses in each elastomeric layer similar to the gradation used in the Dolling et al bearing. The Boschi support does not include nonextensible laminations, however, and is only intended to accommodate relative displacements of opposite sides of the bearing. An arguably related gradation is found in the laminated bearings described and illustrated in Hinks U.S. Pat. No. 3,071,422 and Krotz U.S. Pat. No. 3,179,400, the latter of which is owned by the assignee of the present application. In the Krotz bearing, and in the bearing shown in FIG. 3 of Hinks, the thickness of each annular elastomeric layer continuously increases in a radial direction toward the outer circumference of the layer. Assuming that each layer of elastomer has a uniform modulus of elasticity throughout, the increase in layer thickness will result in a continuous decrease in compression modulus. In the Krotz bearing, at least, the purpose of the gradation of the layer thicknesses is to maintain throughout each layer a uniform torsional motion induced shear stress. Neither the Krotz patent nor the Hinks patent recognizes the problem of compression induced shear strain.

SUMMARY OF THE INVENTION

The present invention is directed to an annular laminated elastomeric bearing in which the layers of elastomer have radially varying moduli of elasticity that tend to minimize or eliminate variations between the compression induced shear strains adjacent the inner and outer circumferences of each layer. According to the invention, a laminated bearing comprises a plurality of alternating and bonded together layers of elastomeric material and nonextensible material. The layers alternate along a common axis extending lengthwise of the bearing so that the bearing can support substantial compressive loads applied generally normal to the layers. The layers include at least one elastomeric layer which, if formed to have a nominally constant modulus of elasticity throughout and if subjected to a predetermined compressive load, would experience a shear strain adjacent one of its inner and outer circumferences greater than the shear strain adjacent the other circumference. Such a difference in compression-induced shear strains would tend to cause uneven wearing of and a reduced service life for the elastomeric layer and the bearing. To avoid or minimize the wear problem, the elastomeric layer that has different compression-induced edge shear strains with a constant modulus of elasticity is formed to have a higher nominal modulus of elasticity adjacent its circumference which would experience the larger strain with constant modulus elastomer. The nominal modulus of elasticity of the elastomer adjacent the other circumference of the elastomeric layer is lower than the modulus adjacent the first circumference. The difference between the nominal moduli of elasticity is such that the ratio of the shear strain due to the predetermined compressive load adjacent the first circumference of the elastomeric layer to the shear strain due to the predetermined compressive load adjacent the other circumference of the elastomeric layer is less than the corresponding ratio of shear strains in the layer if formed to have a nominally constant modulus of elasticity throughout.

Ideally, the ratio between the compression-induced shear strains adjacent the inner and outer circumferences of each elastomeric layer should be unity. In practice, however, exact equalization of the two compression induced shear strains will be difficult, if not impossible, to attain. Such considerations as the availability of only a limited number of different stocks of elastomeric material will prevent the selection of elastomeric materials having precisely the right moduli to equalize the compression-induced shear strains. The moduli of elasticity of different stocks of elastomer or of different portions of an individual elastomeric layer will also be affected by the use of elastomeric filler material in the fabrication of a bearing. For example, in one method of fabricating a laminated elastomeric bearing, the elastomeric layers are cut from sheets of elastomer and stacked up by hand with the layers of nonextensible material. As heat and pressure are applied to bond the elastomeric and nonextensible laminations together, elastomer that has a modulus of elasticity intermediate the moduli of the elastomers in the layers is often introduced into the mold for the bearing to develop molding pressure, to fill in gaps, and to bring the elastomeric layers to full size. The transfer or filler elastomeric material may mix with the basic elastomer stocks in the layers, thereby altering their moduli of elasticity, or the filler material may form a thin layer along one or both circumferential surfaces of an annular bearing. To distinguish between the modulus of elasticity of a basic elastomeric stock in a layer of elastomer and the modulus of elasticity of the basic stock when mixed with small amounts of filler material or of the filler material itself when forming a relatively thin or narrow surface coating on the layer of elastomer, the modulus of elasticity of a basic stock of elastomer used in a layer of elastomer is termed herein the "nominal" modulus of elasticity of the stock. The addition of small amounts of filler material is presumed not to affect the nominal modulus of elasticity to a significant extent (i.e., in a way that would defeat the purpose of the present invention). Similarly, the presence of a thin coating of a filler elastomer on a layer of a basic elastomeric stock is to be ignored. Typically, filler or transfer material will compose about 10% or less of the volume of an elastomeric layer in a laminated elastomeric bearing.

It has been found that for a great many annular laminated elastomeric bearings, the elastomer adjacent the inner circumferential surface of each elastomeric layer will experience higher compression induced shear strains with a uniform modulus elastomer stock than will the elastomer adjacent the outer circumferential surface of the layer. In a preferred embodiment of the present invention, therefore, each annular layer of elastomer has a higher modulus of elasticity adjacent its inner circumference than adjacent its outer circumference. It is also preferable that each layer of elastomer have at least three different moduli of elasticity. Each layer thus includes at least three different annular zones, each of which has a different modulus of elasticity. The moduli of elasticity progressively decrease from zone to zone in a radial direction away from the circumferential edge of the layer which would experience the higher compression-induced shear strain if the layer had a nominally constant modulus of elasticity.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF AN EMBODIMENT

Figures 1, 2, 3:
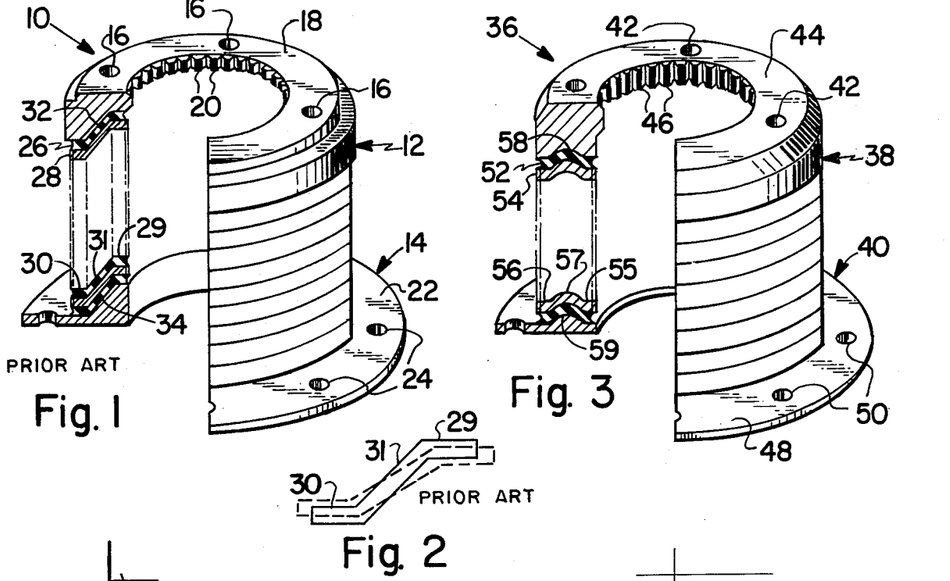
FIG. 1 is a perspective view, partly in section, of a laminated bearing of a type that has been found to be subject to failure of the elastomeric laminations in high stress, long service life environments.
FIG. 2 is a radial half-section of one of the nonextensible laminations of the bearing of FIG. 1, showing the assumed deformation of the lamination when the bearing is subjected to a large compressive load.
FIG. 3 is a perspective view, partly in section, of a laminated bearing constructed according to the invention of application Ser. No. 632,423, filed Nov. 17, 1975.

FIG. 1 of the drawings illustrates a laminated bearing 10 that is suitable and intended for use as a thrust bearing in a retention system for a helicopter rotor blade (not shown). The bearing 10 includes two annular and substantially inflexible end members or end plates 12 and 14 that are axially spaced apart. Circumferentially spaced bolt holes 16 in a flat upper surface 18 of the end plate 12 permit the end plate 12 to be attached to another member, such as the pedestal for a helicopter rotor blade (not shown). Compressive loads are thus applied to the bearing 10 along the flat surface 18. Rotational movements of the rotor blade about its longitudinal axis (i.e. pitch change movements) are transmitted to the bearing 10 through splines 20 formed to extend lengthwise of the bearing on a radially interior circumferential surface of the end plate 12. The splines 20 mesh with corresponding splines on the shaft of the helicopter rotor blade. To permit the opposite or base end of the bearing 10 to be secured to another member, such as a member connecting the bearing 10 to a spherical laminated bearing, the end plate 14 has a radially outwardly extending flange 22 formed with circumferentially spaced bolt holes 24.

Between the end plates 12 and 14 are a plurality of alternating and bonded annular layers or laminations of elastomeric material and nonextensible material. In the bearing of FIG. 1, there are 52 elastomeric layers 26 and 51 layers of nonextensible material 28. The number of layers may be varied to suit the space and/or the functional requirements of a particular installation. The layers 26 and 28 alternate along the longitudinal axis of the bearing 10 so that the compressive load on the surface 18 of the end plate 12 is applied generally normal, rather than parallel, to at least part of the layers. The elastomeric layers 26 are formed of natural rubber, while the layers of nonextensible material 28 are formed of steel. Other elastomeric and nonextensible materials may be substituted for the rubber and steel where appropriate. Alternate elastomeric materials may include synthetic rubber, while alternate nonextensible materials may include other metals, sheets of fiberglass, and sheets of reinforced plastic.

Each of the layers or laminations 26 and 28 has an annular, radially inner circumferential or peripheral portion 29 and an annular, radially outer circumferential or peripheral portion 30. Both peripheral portions 29 and 30 are planar and normal to the longitudinal axis of the bearing 10, although they are not coplanar. An annular intermediate portion 31 of each layer or lamination 26 and 28 extends radially from the outer annular portion 30 of the layer to the inner annular portion 29 of the layer at an upward angle toward the end plate 12. The resulting configuration of the layers, particularly of the layers of nonextensible material 28, stabilizes the bearing 10 against lateral buckling, as is taught by Peterson U.S. Pat. No. 3,292,711. To help insure uniform transfer of compressive loads to the laminations 26 and 28, the end plate surfaces 32 and 34 that are adjacent and bonded to the layers are machined to match the configuration of the laminations.

Although laminated bearings similar to the bearing 10 of FIG. 1 have been utilized in rotor blade retention systems, the bearings have generally not attained a service life in excess of 1,000 operating hours. Examination of failed bearings similar to bearing 10 has shown that failure is due to extrusion and destruction of the elastomeric laminations 26 adjacent the lower end plate 14 on the radially inner circumference of the bearing and adjacent the upper end plate 12 on the radially outer circumference of the bearing. To explain this unusual failure phenomenon, it was, and is, hypothesized that under compressive loads, the laminations 26 and 28 of the bearing 10 seek to "flatten out", as shown in phantom in FIG. 2 of the drawing. Although the relative deformation of the lamination may be exaggerated in FIG. 2 for purposes of illustration, it is believed that the noncoplanar peripheral portions 29 and 30 of each lamination seek to move into alignment and toward a common plane so that the ultimate shape of each lamination, under maximum load, would be mildly conical. The radially inner circumferential portion 29 of each lamination moves downwardly and the radially outer circumferential portion 30 of each lamination moves upwardly, assuming that the bearing is oriented as shown in FIG. 1. Thus, along the radially inner circumference of the bearing 10, the laminations tend to flex away from the upper end plate 12. For the laminations 26 and 28 adjacent the end plate 12, the large thickness of elastomer between them and the end plate 14, as represented by the layers of elastomeric material throughout the length of the bearing 10, freely accommodates the flexing of the radially inner circumferential portions 29 of the laminations. The compression-induced strains in the elastomeric layers 26 adjacent the end plate 12 are thus relatively low. For the laminations 26 and 28 closer to the opposite end plate 14, on the other hand, the radially inner circumferential portions 29 of the laminations cannot freely flex away from the end plate 12 because of the inflexible mass of the end plate 14. Consequently, the radially inner peripheral portions 29 of the laminations 26 of elastomeric material that are relatively close to the end plate 14 are pinched and highly strained as they bulge from between the intervening peripheral portions 29 of the nonextensible laminations 28. The high strains increase the wear on the elastomeric laminations 26 and cause early fatigue failure of the laminations and extrusion of elastomer from between the metal laminations adjacent the end plate 14.

The phenomenon that is believed to produce high compression-induced strains in the radially inner portions 29 of the elastomeric laminations 26 adjacent the end plate 14 is also believed to produce a similar but opposite result adjacent the radially outer periphery of the bearing 10. Specifically, the radially outer peripheral portions 30 of the lamination 26 and 28 tend to flex or move away from the end plate 14 and toward the end plate 12. The result of the flexing is that the compression-induced strains in the layers of elastomeric material 26 adjacent the end plate 14 are substantially reduced since the layers of nonextensible material 28 are relatively free to move toward the end plate 12. With increasing proximity to the end plate 12, however, there is less elastomer between each nonextensible lamination 28 and the substantially inflexible end plate 12 to accommodate flexing of the lamination 28. As a result, the radially outer peripheral portions 30 of the elastomeric laminations 26 adjacent the end plate 12 are highly strained, thereby producing the second area of early failure of the elastomeric laminations which has appeared in tested versions of the bearing 10.

The foregoing hypothesis appears to have been confirmed by computer finite element analyses of the strains in the elastomeric laminations 26. Information obtained from such a computer analysis is presented graphically in FIG. 5 of the drawing. Relative compression-induced edge shear strain (i.e. the radial strain associated with bulging) is plotted along the vertical axis of the graph in FIG. 5. The locations of the laminations 26, as represented by numbers from 1 to 52, are plotted along the horizontal axis. The lower lamination numbers represent the laminations 26 adjacent the end plate 14 and the higher lamination numbers represent the laminations 26 adjacent the end plate 12. The curve 60 represents the relative strains experienced by the radially inner circumferential portions 29 of the elastomeric laminations 26. The curve 61 represents the relative strains experienced by the radially outer peripheral portions 30 of the laminations 26. Curve 61 resembles curve 60 but is reversed from left to right. In other words, the curve 61 rises from a low compression-induced edge shear strain for lamination number one (1) to a high compression-induced strain for lamination number fifty-two (52).

A bearing 36, according to the invention of application Ser. No. 632,423, filed Nov. 17, 1975, overcomes the high compression-induced strains and the resulting decrease in service life experienced with the bearing 10 of FIG. 1. As shown in FIG. 3, the bearing 36, like the bearing 10, includes two annular and substantially inflexible end plates 38 and 40 that are axially spaced apart. The end plate 38 may be attached to another member, such as the pedestal base of a helicopter rotor blade (not shown), utilizing bolts (not shown) screwed into bolt holes 42 formed in the flat upper surface 44 of the end plate. Compressive loads are thus applied to the surface 44 of the end plate 38. As in the bearing 10 of FIG. 1, rotational movements of the helicopter rotor blade about its longitudinal axis are transmitted to the bearing 36 through splines 46 that extend lengthwise of the bearing 36 and are formed on a radially inner circumferential surface of the end plate 38. The end plate 40 has a radially outwardly extending flange 48. Bolt holes 50 are formed in the flange 48 so that the end plate 40 may be attached to a member (not shown) connecting the bearing 36 to a spherical laminated bearing, for example, in a helicopter rotor blade retention system.

Between the end plates 38 and 40 are a plurality of alternating and bonded annular layers or laminations of elastomeric material and nonextensible material 52 and 54, respectively, The layers alternate along a common axis extending lengthwise of the bearing 36 with adjacent layers 52 and 54 being bonded to each other in aligned overlapping relationship. There are 52 elastomeric layers 52 and 51 nonextensible laminations 54, the numbers being variable according to space and functional requirements. As in the bearing 10 of FIG. 1, the laminations 52 and 54 are preferably formed of natural rubber and steel, although other elastomeric and nonextensible materials may be utilized. The end plates 38 and 40 are bonded to adjacent elastomeric layers 52.

Each lamination 52 and 54 has an annular, radially inner circumferential or peripheral portion 55 and an annular, radially outer circumferential or peripheral portion 56. The portions 55 and 56 are coplanar and normal to the longitudinal axis of the bearing 36. Located between and integral with the inner and outer circumferential or peripheral portions 55 and 56 or each layer 52 and 54 is an annular intermediate portion 57 that projects longitudinally toward the end plate 38. The intermediate portion 57 of each layer 52 and 54 is concavo-convex in section taken radially of the longitudinal axis of the bearing 36. Stated another way, each layer 52 and 54 has, in radial half-section, a flat outer edge 56, a coplanar inner edge 55, and a concavo-convex intermediate portion 57 joining the two edge portions. To insure uniform load transfer, the end plate surfaces 58 and 59 that are adjacent and bonded to the laminations 52 and 54 are machined to match the laminations.

The laminations 52 and 54 of the bearing 36 are configured to provide lateral or radial buckling stability for the bearing and to reduce their tendency to "flatten out" under compressive loads. While not clearly shown in FIG. 3, the intermediate portion 57 of each nonextensible lamination 52, and the surface 59 of the end plate 40, projects into the concavity of the succeeding lamination 52 or of the surface 58 of the end plate 38. The "symmetry" of the laminations 52 and 54, when viewed in radial half-section, is believed to provide the same lateral stability as laminations 26 and 28 of bearing 10, but with a smaller height or axial projection of the laminations 52 and 54. With a smaller "height", there is believed to be less tendency for the laminations 52 and 54 to "flatten out" under compressive loads.

A computer finite element analysis was made of a laminated bearing 36 constructed according to FIG. 3. A single grade or stock of elastomer was used for every elastomer layer 52 in the bearing and each elastomeric layer had the same thickness. The theoretical compression-induced edge shear strains experienced by the radially inner circumferential portions 55 of the elastomeric layers 52 were found to be generally the same over a substantial central portion of the length of the bearing 36. Adjacent the end plate 38, however, the compression-induced strains in the layers of elastomer 52 increased substantially, while adjacent the end plate 40, the compression-induced strains in the layers of elastomer decreased substantially. The relative theoretical compression-induced strain in each layer of elastomer 52 is represented graphically by the curve 62 in FIG. 5. An analysis of the compression-induced strains in the radially outer circumferential portions 56 of the layers of elastomeric material 52 revealed an essentially identical distribution, but lower magnitude, of strains. In other words, adjacent the end plate 38, the radially outer edges 56 of the elastomeric layers 52 experienced relatively high compression-induced strains, while adjacent the end plate 40, the layers of elastomeric material experienced lesser compression-induced strains, as compared to the strains in the layers of the central lengthwise portion of the bearing 36.

Figures 4, 5:
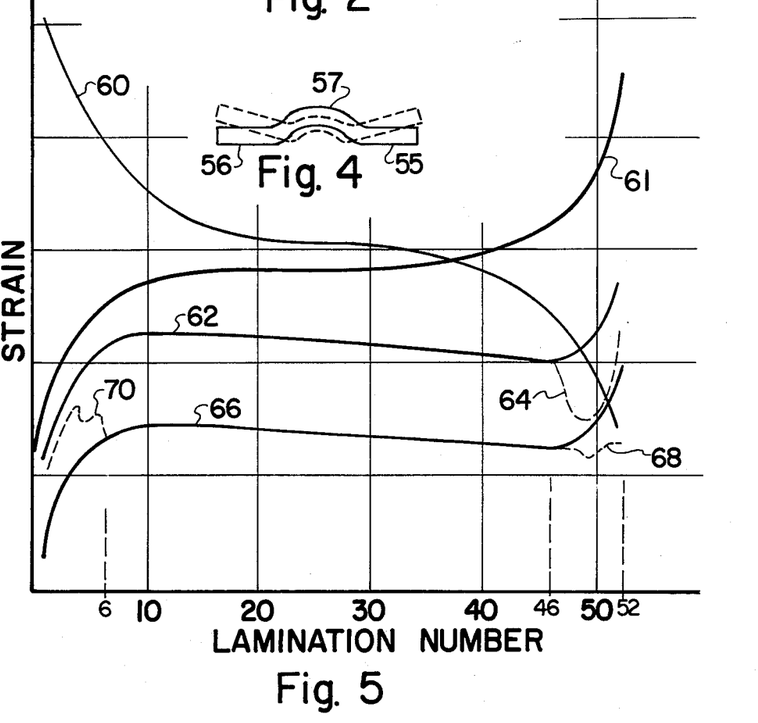
FIG. 4 is a radial half-section of one of the nonextensible laminations of the bearing of FIG. 3, showing the assumed deformation of the lamination when the bearing of FIG. 3 is subjected to a large compressive load.
FIG. 5 is a graphical representation of the compression-induced strains experienced by the elastomeric layers in the bearings of FIGS. 1 and 3.

The variation in the compression-induced strains adjacent the end plates 38 and 40 in the bearing 36 of FIG. 3 is believed to be the result of a deformation of the layers 54 of nonextensible material in the bearing 36, as illustrated in phantom in FIG. 4 of the drawing. Specifically, under high compression loads, the nonextensible laminations 54 seek to flatten out. The intermediate, concavo-convex portion 57 of each lamination 54 tends to move into the plane of the peripheral portions 55 and 56 of the lamination. At the same time, the peripheral portions 55 and 56 of each lamination 54 seek to move upwardly toward the concavo-convex portion 57 of the lamination. Adjacent the end plate 38, the intermediate concavo-convex portions 57 of the nonextensible laminations 54 can flex away from the substantially inflexible end plate due to the large thickness of elastomer between the nonextensible laminations and the end plate 40, as represented by the many layers of elastomer throughout the length of the bearing 36. The flat or peripheral portions 55 and 56 of the laminations 54 that are adjacent the end plate 38, on the other hand, cannot freely move toward the end plate 38. Consequently, the peripheral portions 55 and 56 of the layers 52 of elastomeric material adjacent the end plate 38 are pinched and highly strained as they bulge from between adjacent peripheral portions 55 and 56 of the nonextensible laminations 54.

At the end of the bearing 36 adjacent the end plate 40, the planar peripheral portions 55 and 56 of each layer or lamination 54 are free to flex toward the end plate 38. Although the intermediate concavo-convex portions 57 of the nonextensible laminations 54 seek to move toward the end plate 38, the concavo-convex portions 57 of the layers of elastomeric material 52 are essentially confined by the peripheral portions 55 and 56 of the layers 52. As a result, the intermediate portions 57 of the elastomeric laminations 52 cannot bulge in response to the compressive loads on the laminations. The high stresses on the intermediate portions 57 of the elastomeric layers 52 adjacent the end plate 40 are thus resisted essentially through bulk compression of the elastomer without the wear that accompanies the bulging and resultant pinching experienced by the peripheral portions 55 and 56 of the layers 52 adjacent the end plate 38.

Although the configuration of the laminations 52 and 54 reduces the level of the compression-induced strains in the laminations 52, the relatively higher strains in the elastomeric laminations 52 adjacent the end plate 38 represent a potential for early fatigue failure of the bearing 36. To reduce the difference in the compression-induced strains experienced by the various elastomeric layers 52 along the length of the bearing, the six elastomeric layers 52 closest to the end plate 38 (i.e. layers number 47 to 52) in one embodiment of the bearing 36 were specified to be of an elastomer that is stiffer and has a higher elastic modulus (i.e. Young's modulus) than the elastomer in the laminations of the central lengthwise portion of the bearing. The higher elastic modulus of the elastomer brought higher compression moduli and higher compression stiffnesses for the individual layers 52. The resulting decrease in compression-induced strains experienced by the layers 52 is indicated by the dashed line 64 in FIG. 5. The reduction in the compression-induced strains, while beneficial, produced an unnecessary or over-reduction of the strains in laminations number 48 to 51. The use of a stiffer elastomer in laminations number 47 to 52 also increased the torsional spring rate of the overall bearing 36 to an undesirably high level.

In a second embodiment utilizing the bearing construction illustrated in FIG. 3 of the drawing, all of the layers of elastomer 52 in the bearing 36 were of an elastomer somewhat stiffer than the elastomer used in the first embodiment. The theoretical compression-induced strains in the elastomeric layers 52 of the bearing 36 incorporating the stiffer elastomer are illustrated by the curve 66 in FIG. 5. To reduce the compression-induced strains in the layers 52 adjacent the end plate 38, the six elastomeric laminations 52 (i.e. laminations number 47 to 52) adjacent the end plate 38 were again specified to be of elastomer that is stiffer or has a higher elastic modulus than the elastomer utilized in the central lengthwise portion of the bearing. Instead of providing each of laminations number 47 to 52 with the same elastomer, however, laminations number 47, 48 and 49 were formed of one elastomer, while laminations number 50, 51 and 52 were fabricated of a second elastomer that is stiffer than both the elastomer used for laminations number 47, 48 and 49 and the elastomer utilized in the central lengthwise portion of the bearing 36. The results of a computer finite element analysis of the strains in the modified elastomeric layers 52 of the bearing are represented by the dashed line 68 extending from the solid line 66 in FIG. 5. The strains in laminations number 47 to 52 were reduced as in the previously described embodiment of bearing 36, but the reduction resulted in a more nearly equal strain in each of the layers.

The use of elastomer that is relatively stiff in the elastomeric laminations 52 adjacent the end plate 38 increases the torsional spring rate of the bearing 36.

Depending upon the application intended for the bearing 36, an increase in the torsional spring rate or stiffness of the bearing may or may not be acceptable. In situations where an increased torsional spring rate is not acceptable, the increased spring rate may be readjusted downward by taking advantage of the relatively low compression-induced strains in the elastomeric laminations 52 adjacent the end plate 40. By fabricating these laminations 52 from an elastomer that has a relatively low elastic modulus, each layer will have both a relatively low compression stiffness and a relatively low torsional stiffness. The softer elastomer will cause the laminations 52 to deflect to a greater extend under compressive loads and thus experience a greater compression-induced strain. Larger compression-induced strains are acceptable, however, because of the relatively higher strains experienced by the elastomeric laminations in the central lengthwise portion (i.e. laminations number 7 to 46) of the bearing 36. At the same time, the increased torsional "softness" or reduced torsional stiffness of the laminations 52 adjacent the end plate 40 will offset the increased torsional stiffness of the laminations 52 adjacent the end plate 38.

In the bearing 36 incorporating one elastomeric stock in the central lengthwise portion of the bearing and two stiffer stocks adjacent the end plate 38, softer elastomers were incorporated in the six elastomeric layers adjacent the end plate 40. Elastomeric laminations number 1, 2 and 3 were fabricated of an elastomer softer than the elastomer used anywhere else in the bearing. Elastomeric laminations number 4, 5 and 6 were formed of an elastomer having a modulus of elasticity greater than the modulus of elasticity of the elastomer in laminations number 1, 2 and 3 but less than the moduli of elasticity of the elastomers in layers number 7 to 52. The results of a computer analysis of the changes in compression-induced strains are illustrated by the dashed line 70 in FIG. 5 extending from the solid line 66. The use of progressively stiffer elastomers in the layers of elastomeric material 52 adjacent the upper end plate 38 (to produce higher compression moduli for the layers) in combination with the use of progressively softer elastomers in the layers of elastomeric material 52 adjacent the end plate 40 (to produce lower compression moduli for the layers) permitted a substantial equalization of the compression-induced strains through the elastomeric bearing 36 without substantially affecting the torsional spring rate of the bearing.

While the grading of the stiffnesses of the elastomeric layers in a laminated bearing may be utilized to adjust the compression-induced strains in any bearing that has layers contoured to project toward one end of the bearing, grading is particularly advantageous for bearings that incorporate laminations having a symmetrical configuration in radial section, similar to laminations 52 and 54 of the bearing 36 of FIG. 3. With the symmetry, in radial half-section, of the laminations 52 and 54, the compression-induced strains experienced by the radially inner and outer circumferential portions of the elastomeric laminations 52 vary in unison from a low in the laminations 52 adjacent the end plate 40 to a high in the laminations 52 adjacent the end plate 38. Thus, a gradation of elastomer stocks which is suitable for the inner circumferential portions 55 of the laminations 52 is also a suitable gradation of stocks for the outer circumferential portions 56 of the layers. In contrast, in the bearing 10 of FIG. 1, the compression-induced strains in the radially inner circumferential portions 29 of the elastomeric laminations 26 vary in exactly the opposite direction as the compression-induced strains in the radially outer circumferential portions 30 of the elastomeric layers. Thus, if each elastomeric lamination 26 in the bearing 10 of FIG. 1 is to be made of single elastomer stock, the layers 26 adjacent both end plates 12 and 14 must be fabricated of relatively stiff elastomer stocks. Such a design, while having a favorable effect on the high compression-induced strains in the elastomeric layers 26, will also significantly increase the torsional spring rate of the bearing 10, which may or may not be desirable. It would also be conceivable, however, to grade or vary the elastomer stiffness within each layer (i.e. radially), in conjunction with grading the stiffness of successive layers. A radial gradation of elastomer stiffnesses will increase the cost of fabricating a bearing such as bearing 10, as will become apparent. At the same time, radial gradation offers the offsetting advantages of minimizing the increase in torsional spring rate that would be associated with gradation of elastomer stiffnesses from layer to layer and of minimizing the difference between the compression induced shear strains experienced by the inner circumferential portion 29 and the outer circumferential portion 30 of each elastomeric layer 26. If the compression induced shear strains in the two circumferential portions 29 and 30 can be maintained as nearly equal as possible, it is less likely that one of the two circumferential portions will fail significantly earlier than the other circumferential portion.

To achieve effective gradation of the stiffness or modulus of elasticity of the elastomer in every layer 26 of the bearing 10, the modulus must be increased in the portion or portions of each layer that would experience a high compression induced shear strain if the layer had a single modulus or stiffness throughout. Looking to curves 60 and 61 in FIG. 5 for guidance, it is apparent that the radially inner circumferential portions 29 of elastomeric laminations number 1 through 37 experience higher compression induced shear strains than their radially outer counterparts 30, when each lamination has a single modulus of elasticity throughout. Consequently, the radially inner circumferential portions 29 of elastomeric laminations number 1 through 37 must be formed to have a higher modulus of elasticity than the radially outer portions 30, if the two portions 29 and 30 of each lamination are to experience more nearly equal compression-induced shear strains. For elastomeric laminations number 38 through 52, on the other hand, the radially outer circumferential portions 30 experience higher compression induced shear strains than the radially inner circumferential portions 29, when each lamination has a single modulus of elasticity throughout. Thus, it is the radially outer circumferential portions 30 of elastomeric laminations number 38 through 52 which must have a higher modulus of elasticity than the radially inner circumferential portions 29 of the laminations in order to minimize the difference between the compression induced shear strains experienced by the two circumferential portions.

Radial gradation of the modulus of elasticity of each elastomeric lamination 26, as described above, will tend to cause corresponding points on curves 60 and 61 to move closer to each other. If the radial gradation is combined with the layer-to-layer axial gradation of moduli previously described, the curves 60 and 61 will also tend to flatten out, thereby showing that corresponding portions of successive layers are experiencing more nearly equal compression induced shear strains. Nonetheless, if the radial and axial gradations of moduli only involve increasing the moduli of elasticity of selected portions of elastomeric laminations 26, in comparison to the single modulus assumed to exist throughout the elastomeric laminations for purposes of generating curves 60 and 61, other characteristics of the bearing 10 may be adversely affected. Higher moduli of elasticity will produce higher axial and torsional spring rates for the bearing 10, for example. Depending upon the design specifications, such increased spring rates may not be acceptable.

If, for example, it is desired to minimize the variations in compression induced shear strains within the elastomeric laminations 26, without significantly affecting the torsional and axial spring rates determined by the use of a single modulus of elasticity $y$ for all elastomeric laminations, a more complicated radial gradation of moduli may be required. Using modulus of elasticity $y$ as a base, some portions of elastomeric laminations 26 should have a higher modulus of elasticity $x$, while other portions of the laminations should have a lower modulus of elasticity $z$. In addition, only the elastomeric laminations 26 that experience the most severe variation in compression induced shear strain from circumference to circumference should incorporate radially graded moduli of elasticity. Thus, for example, the inner circumferential portions 29 of elastomeric laminations number 1 through 12 should be provided with modulus of elasticity $x$, where curve 60 represents the compression induced shear strains experienced with modulus of elasticity y. The higher modulus of elasticity will reduce the compression induced shear strains in portions 29 to levels more nearly equal to the shear strains experienced by the inner circumferential portions 29 of laminations number 13 through 42. The outer circumferential portions 30 of elastomeric laminations number 1 through 12, on the other hand, should be provided with modulus of elasticity $z$. The use of modulus of elasticity $z$ will increase the compression induced shear strains in comparison to the strains experienced with modulus $y$, as represented by curve 61 of FIG. 5. An increase in compression induced shear strains in the radially outer circumferential portions 30 of elastomeric laminations number 1 through 12 will increase the strains in portions 30 of laminations number 1 through 12 to levels more nearly equal to the strains experienced by the outer circumferential portions 30 of laminations 13 through 42. The lower modulus of elasticity $z$ in circumferential portions 30 will also offset the higher modulus of elasticity $x$ in circumferential portions 29 in terms of effect on the torsional spring rate of the bearing 10. In order to minimize further the effect of varying the modulus of elasticity on the torsional and axial spring rates of the bearing 10, modulus of elasticity $y$ should be retained in portions 31 of laminations number 1 through 12.

The torsional spring rate or torsional stiffness of any elastomeric element is inversely proportional to its thickness and directly proportional to its shear modulus, its bonded surface area, and the square of the distance to the axis about which the torsional motion is taking place. The shear modulus of an elastomer is directly proportional to its modulus of elasticity. For most common elastomer stocks, the shear modulus is $\frac{1}{3}$ to $\frac{1}{4}$ of the modulus of elasticity. In the bearing 10, the thickness of each elastomer lamination 26 is constant throughout. The bonded surface area of the outer circumferential portion 30 of each elastomeric lamination 26 is definitely greater than the bonded surface area of portion 29 of each lamination and probably greater than the bonded surface area of portion 31. The distance to the rotational axis is also largest for the outer circumferential portion 30 of each lamination 26. Thus, the modulus of elasticity of the elastomer in the radially outer circumferential portions 30 of the laminations 26 will have the greatest influence on the torsional spring rate of the bearing 10. For laminations number 1 through 12, if the modulus of elasticity is graded as described in the preceding paragraph, the torsional spring rate of each lamination, and of the group of laminations, should actually be less than the corresponding spring rate if modulus of elasticity $y$ were used throughout.

If three different moduli of elasticity are utilized in elastomeric laminations number 1 through 12 of bearing 10, three different moduli can also be used to advantage in elastomeric laminations number 43 through 52, for example. The direction in which the moduli are graded will be reversed, however. Thus, the radially outer circumferential portions 30 of laminations number 43 through 52 should have modulus of elasticity $x$, intermediate portions 31 should have modulus of elasticity $y$, and radially inner circumferential portions 29 should have modulus of elasticity $z$. The effect on the compression induced shear strains, in comparison to a bearing 10 in which only modulus of elasticity $y$ is used, will be a smaller difference between the strains in the inner and outer circumferential portions 29 and 30 of each of laminations number 43 through 52. The torsional spring rates for laminations number 43 through 52 will increase in comparison to the spring rates of the laminations with a single modulus of elasticity $y$. Nonetheless, the overall effect on the torsional spring rate of the bearing 10 should be virtually nothing if elastomeric laminations number 1 through 12 are modulus graded in the opposite radial direction, as described above.

Figure 6:
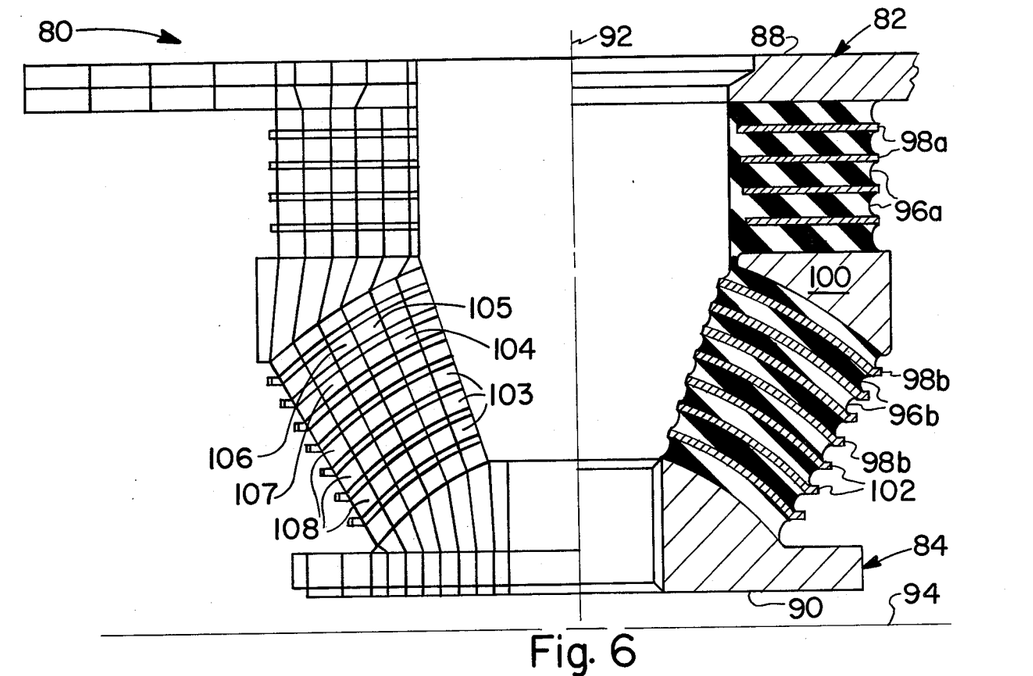
FIG. 6 is a partial sectional view of a laminated bearing according to the present invention.

The foregoing discussion has dealt with the radial gradation of moduli of elasticity in a laminated elastomeric bearing 10 that incorporates elastomeric laminations of a relatively unusual configuration. Nonetheless, radial gradation of moduli of elasticity can also be used to advantage in laminated elastomeric bearings of more conventional construction. FIG. 6 of the drawings illustrates a laminated elastomeric bearing 80 that is suitable and intended for use as a pivot in a pitch control system for a helicopter tail rotor blade (not shown). The bearing 80 includes two annular and substantially inflexible end members or end plates 82 and 84 that are axially spaced apart. Two diametrically opposed bolt holes (not shown) formed in a flat upper surface 88 of the end plate 82 permit the end plate to be attached to another member, such as a torque tube (not shown) connecting a helicopter tail rotor blade to a pitch link arm (not shown). A correspondingly flat bottom surface 90 of the end plate 84 may be secured, by clamping or adhesive bonding, for example, to a member such as a flexure strap (not shown) interconnecting two diametrically opposed tail rotor blades (not shown). Compressive loads are thus initially applied to the bearing 80 in a direction generally normal to the flat surfaces 88 and 90. The bearing 80 also accommodates rotational movements about the longitudinal axis 92 of the annular bearing and about an axis 94 that is oriented perpendicular to the axis 92. The axis 94 is located a short distance from and is oriented parallel to the bottom surface 90 of the end plate 84.

Between the end plates 82 and 84 are a plurality of alternating and bonded together annular layers or laminations of elastomeric material and nonextensible material 96 and 98, respectively. The layers 96 and 98 alternate along the longitudinal axis 92 of the bearing 80 with adjacent layers 96 and 98 being bonded to each other in aligned, overlapping relationship. As in the bearings 10 and 36 of FIGS. 1 and 3, respectively, the laminations 96 and 98 are preferably formed of natural rubber and steel, although other elastomeric and nonextensible materials may be utilized. The end plates 82 and 84 are bonded to adjacent elastomeric layers 96. In the illustrated embodiment of the bearing 80, there are thirteen elastomeric laminations 96 and eleven nonextensible laminations 98.

Intermediate the end plates 82 and 84 is a substantially rigid insert 100 that is annular in shape and is bonded to and between two adjacent elastomeric laminations 96. The rigid insert 100 divides the elastomeric and nonextensible laminations 96 and 98 into two groups. The elastomeric laminations 96a and nonextensible laminations 98a located between the end plate 82 and the insert 100 are generally flat annular elements. There are five elastomeric laminations 96a and four nonextensible laminations 98a. The thickness of the elastomeric laminations 96a increases slightly from lamination to lamination in a direction away from the end plate 82 and toward the insert 100. The nonextensible laminations 98a are all of the same thickness. Between the end plate 84 and the insert 100 are eight elastomeric laminations 96b and seven nonextensible laminations 98b. Each of the laminations 96b and 98b is formed as an annular portion of a sphere. Adjacent their radially outer circumferences, the nonextensible laminations 98b have planar flanges 102 that facilitate positioning the nonextensible laminations in a mold during fabrication of the bearing. Each of the nonextensible laminations 98b is of the same thickness. The elastomeric laminations 96b, on the other hand, progressively decrease in thickness in a direction away from the end plate 84 and toward the insert 100.

To demonstrate the effect of radial gradation of moduli of elasticity on the compression induced shear strains experienced by the elastomeric laminations of a laminated elastomeric bearing, a computer finite element analysis was made of a laminated bearing substantially identical to the bearing 80 shown in FIG. 6. The finite element analysis was performed using a computer program derived from the finite element program TEXGAP which was developed by R. S. Dunham and E. B. Becker at the University of Texas at Austin. The general analytical approach is described in greater detail in a paper entitled "Application of Finite-Element Method To The Analysis Of High-Capacity Laminated Elastomeric (Incompressible) Parts" prepared by B. P. Gupta and R. H. Finney (the latter being the present inventor). The paper was presented at the 1977 spring meeting of the Society For Experimental Stress Analysis held at Dallas, Tex. on May 15–20, 1977, and was designated Paper No. D-13. Although the analysis of the bearing 80 involved all of the elastomeric and nonextensible laminations 96 and 98 in the bearing, only the results of the analysis on the spherical laminations 96b and 98b are presented herein. The radial gradation of moduli as applied to the disc-like laminations 96a did not prove to be of any benefit. In the analysis, different moduli of elasticity were obtained through the use of different stocks of elastomer. It was found, however, that the variation in moduli of elasticity between the elastomer stocks regularly compounded by the assignee of the present application in the manufacture of laminated elastomeric bearings is too great to permit effective gradation of moduli in the laminations 96a of the bearing 80. Effective gradation of the moduli of elasticity in laminations 96a would have required an assumption that specially compounded stocks of elastomer with particular moduli of elasticity were available. Although specially compounded stocks are possible, the expense of compounding would not ordinarily justify consideration of a bearing design that requires special stocks of elastomer.

In the initial analysis of the elastomeric and nonextensible laminations 96b and 98b of the bearing 80, successive laminations 96b were assumed to have progressively decreasing moduli of elasticity with increasing distance from the end plate 84 and the spherical center (not shown) about which the laminations 96b and 98b are concentrically disposed. Each elastomeric lamination 96b was assumed to be fabricated of the same elastomer stock throughout, however. Each lamination 96b and 98b was also assumed to be divided into six annular sections of equal width, as represented on the left-hand half of FIG. 6. The theoretical compression-induced shear strains experienced by the radially innermost circumferential sections 103 of the elastomeric layers 96b were found to increase slightly from layer to layer in a direction away from the end plate 84 and toward the insert 100. The relative theoretical compression-induced shear strain experienced by the radially innermost section 103 of each layer of elastomer 96b is represented graphically by the curve 110 in FIG. 7. The laminations are numbered such that the lamination 96b closest to the end plate 84 is number 1 and the lamination closest to the inert 100 is lamination number 8. The corresponding relative compression-induced shear strains in the radially outermost circumferential sections 108 of the layers 96b of elastomeric material showed a corresponding increase from layer to layer in a direction away from the end plate 84, as represented by curve 112 in FIG. 7. A comparison of curves 110 and 112 shows that the compression-induced shear strains adjacent the radially inner circumferences of the elastomeric laminations 96b are substantially higher than the compression-induced shear strains adjacent the corresponding outer circumferences of the elastomeric laminations.

In a second computer analysis of the bearing 80, some of the elastomeric laminations 96b were assumed to incorporate more than one modulus of elasticity. The modulus of elasticity of the elastomeric layer 96b closest to the end plate 84 (number 1) was not changed from the modulus assumed in the initial analysis. The elastomer stock assumed to be used in this elastomeric layer 96b was the stiffest or highest modulus stock normally used by applicant's assignee in the manufacture of laminated elastomeric bearings. For the succeeding six elastomeric laminations 96b (numbers 2 through 7), it was assumed that the center two elements 105 and 106 into which each lamination was divided retained the elastomer stock of the first computer analysis. The radially innermost two sections 103 and 104 of each elastomeric lamination 96b were assumed to be fabricated of an elastomer stock having a modulus of elasticity greater than the modulus of elasticity of the elastomer used in the central sections 105 and 106 of the layer. The two radially outermost sections 107 and 108 into which each of the elastomeric laminations 96b was assumed to be divided for purposes of analysis were assumed to be fabricated of an elastomer stock that has a modulus of elasticity less than the modulus of elasticity of the elastomer stock in the central two sections 105 and 106 of the layer. Thus, with the exception of the elastomeric layers 96b closest to the end plate 94 and to the insert 100, each of the elastomeric laminations 96b was assumed to include a central annular zone of elastomer that has the same modulus of elasticity as the elastomer considered in the first analysis for the same layer, a radially innermost annular zone that has a modulus of elasticity higher than the modulus of elasticity of the central zone of the layer, and a radially outermost annular zone that has a modulus of elasticity less than the modulus of elasticity of the central zone. The elastomeric lamination 96b (number 8) closest to the insert 100 was assumed to have generally the same gradation of moduli as the adjacent laminations 96b except that the radially outermost sections 107 and 108 of the lamination were inadvertently assumed to have a higher modulus of elasticity than any other section of the lamination.

Figure 7:
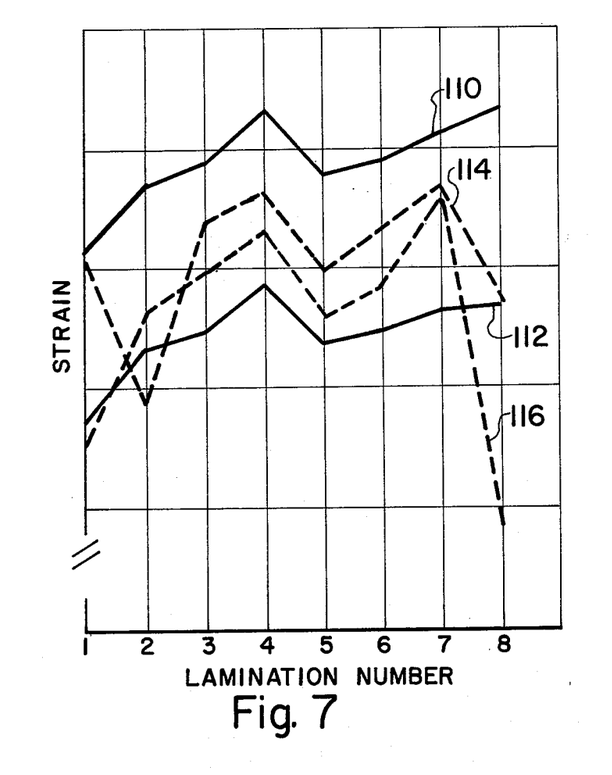
FIG. 7 is a graphical representation of the compression-induced shear strains experienced by the elastomeric layers in the bearing of FIG. 6.

The relative theoretical compression-induced shear strains in the radially innermost sections 103 of the elastomeric layers 96b of the bearing 80, as computed in the second analysis, are illustrated graphically by the dashed curve 114 in FIG. 7. As can be readily seen, the strains represented by the curve 114 are always less than the corresponding strains represented by the curve 110. The relative theoretical compression-induced shear strains in the radially outermost sections 108 of the elastomeric laminations 96b, according to the second analysis, are represented graphically by the dashed curve 116 in FIG. 7. A comparison between the curve 116 and the corresponding curve 112 of the first analysis shows that, with the exception of laminations number 1 and 8, the theoretical compression-induced shear strain in each of the layers 96b increased with respect to the strain computed by the first analysis. More importantly, however, the curves 114 and 116 are, generally speaking, much closer together than are the curves 110 and 112. In other words, when each lamination 96b was assumed to have a single modulus of elasticity, the elastomer in each layer adjacent the inner circumferential surface of the layer experienced a compression induced shear strain that was generally ten to twenty percent (10–20%) greater than the compression induced shear strain experienced by the elastomer adjacent the radially outer circumferential surface of the lamination. When the modulus of elasticity of each elastomeric lamination 96b was graded in a radial direction in accordance with the present invention, on the other hand, the difference between the two compression-induced edge shear strains was generally reduced to five to ten percent (5–10%). As can be seen by looking at the change in compression-induced edge shear strains for lamination number 8, the use of stiffer or higher modulus elastomer on both sides of a softer central zone of elastomer will not have the desired effect of reducing the difference between the compression-induced edge shear strains experienced by the layer. Although the absolute values of the compression-induced edge shear strains have been reduced in lamination number 8, according to the second analysis, the difference between the two edge shear strains in each layer has increased both in absolute terms and in percentage terms.

As suggested by the break line in the ordinate of FIG. 7, the magnitude of the differences between curves 110, 112, 114, and 116 has been magnified for purposes of illustration. The curves 110, 112, 114, and 116 also do not present the compression-induced shear strains experienced by the interior four sections 104, 105, 106, and 107 into which each of the elastomeric laminations 96b was assumed to be divided. Nonetheless, the computer analyses showed, as was to be expected, that the compression-induced shear strains in each lamination 96b decrease with increased distance from the edges of the lamination. At some point relatively close to the center of each elastomeric lamination 96b, the compression-induced shear strain is essentially zero. It should also be appreciated that the foregoing computer analyses assume that if different stocks of elastomer are used in a layer, the stocks will not intermix, for example, so as to modify their respective moduli of elasticity. In actual practice, however, a clear separation between adjacent elastomeric stocks or zones may not be possible.

Figure 6A:
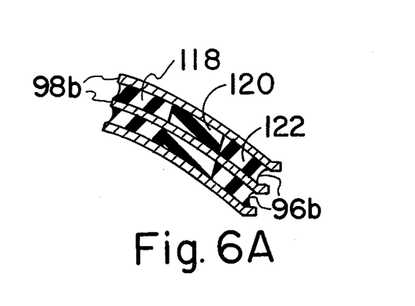
FIG. 6A is a more detailed view of the bearing of FIG. 6 constructed according to the present invention.

As presently envisioned, fabrication of a bearing such as bearing 80, in which the elastomeric laminations 96b are radially graded in terms of their moduli of elasticity, involves the fabrication of a set of three concentric rings of elastomer 118, 120, and 122 for each lamination, as shown in FIG. 6A. The concentric rings 118–122 are cut from calendered stocks of uniform thickness and the desired moduli of elasticity. In FIG. 6A, for example, ring 118 has the highest modulus of elasticity, ring 122 the lowest modulus, and ring 120 an intermediate modulus. The various sets of concentric rings are laid up by hand between the nonextensible elements of the bearing 80, such as the end members 82 and 84 and the nonextensible laminations 98. The hand assembled, but unbonded bearing 80 is then placed in a mold and subjected to heat and pressure in order to bond the elastomeric components to the nonextensible or rigid components of the bearing. As part of the molding step, contiguous rings of each set of three rings which makes up a layer of elastomer 96b soften and probably flow together and intermix along their boundaries. The intermixing of contiguous elastomeric rings along their boundaries will change to some extent the nominal moduli of elasticity of the elastomer stocks used in the rings. In addition, pressure is generally applied to a mold by the injection into the mold of a liquid elastomeric stock that has a modulus of elasticity generally intermediate the moduli of elasticity of the other elastomer stocks used in the bearing. This filler or transfer stock would tend to form a surface coating on or flow into many of the elastomeric components placed in the bearing 80 by design. Although transfer stock normally makes up about ten percent or less of the volume of elastomer utilized in a bearing such as bearing 80, the presence of the transfer stock will probably change the moduli of elasticity of the various elastomer laminations and/or the various zones in the elastomeric laminations from the nominal modulus values used as a basis for the design of the bearing. The present invention is intended to be considered without regard to limited intermixing of stocks or to the small amounts of transfer stock normally encountered in a molding operation such as that described above. At the same time, it is also not expected that the transfer stock, for example, will be of such a volume, modulus, or thickness that a bearing otherwise designed in accordance with the present invention will not actually produce the results expected on the basis of the foregoing discussion.

It will be understood that the embodiments described above are merely exemplary and that persons skilled in the art may make many variations and modifications without departing from the spirit and scope of the invention. For example, the present invention is applicable to many bearings for which the laminations may take many different shapes. All such modifications and variations are intended to be within the scope of the invention as defined in the appended claims.

What is claimed is:

1. In a laminated bearing comprising a plurality of alternating and bonded together layers of elastomeric material and substantially nonextensible material, said layers alternating along a common axis extending lengthwise of the bearing so as to permit the bearing to support compressive loads applied generally normal to the layers and to accommodate torsional loads applied about the common axis, each layer being annular and having with respect to the common axis a radially inner circumference and a radially outer circumference, the layers including at least one layer of elastomeric material which if formed to have a nominally constant modulus of elasticity throughout and if subjected to a predetermined compressive load applied generally normal to the layer would experience a greater shear strain adjacent one of its inner and outer circumferences than adjacent the other of its inner and outer circumferences, the improvement wherein said at least one layer of elastomeric material is formed to have a higher nominal modulus of elasticity adjacent the one of its circumferences than adjacent the other of its circumferences, the difference between said nominal moduli of elasticity being such that a ratio of shear strain due to said predetermined compressive load adjacent the one circumference of said at least one layer to shear strain due to said predetermined compressive load adjacent the other circumference of said at least one layer is less than a corresponding ratio of shear strains in said at least one layer of elastomer if formed to have said nominally constant modulus of elasticity throughout.

2. A laminated bearing, according to claim 1, wherein said at least one elastomeric layer has a higher modulus of elasticity adjacent its inner circumference than adjacent its outer circumference.

3. A laminated bearing, according to claim 1, wherein said at least one elastomeric layer includes at least three annular and generally concentric zones, each zone having a different nominal modulus of elasticity and the different moduli of elasticity progressively decreasing from zone to zone in a radial direction away from said one circumference and toward said other circumference of said at least one elastomeric layer.

4. A laminated bearing, according to claim 1, wherein each elastomeric layer has a higher nominal modulus of elasticity adjacent one of its circumferences than adjacent the other of its circumferences, the one circumference of each layer corresponding to the one circumference of every other layer.

5. A laminated bearing, according to claim 1, also comprising a substantially inflexible end member at each end of the bearing, each end member having a surface contoured to match said layers and bonded to an adjacent layer.

6. In a laminated bearing comprising a plurality of alternating and bonded together layers of elastomeric material and substantially nonextensible material, said layers alternating along a common axis extending lengthwise of the bearing so as to permit the bearing to support compressive loads applied generally normal to the layers and to accommodate torsional loads applied about the common axis, each layer being annular and having with respect to the common axis a radially inner and a radially outer circumference, the improvement wherein at least one layer of elastomeric material includes at least three annular and generally concentric zones, each zone having a different nominal modulus of elasticity and the different nominal moduli of elasticity of said at least three zones progressively decreasing from zone to zone in a radial direction from one of the inner and outer circumferences of said at least one elastomeric layer toward the other of the inner and outer circumferences of said at least one layer.

7. In a laminated bearing comprising a plurality of alternating and bonded together layers of elastomeric material and substantially nonextensible material, said layers alternating along a common axis extending lengthwise of the bearing so as to permit the bearing to support compressive loads applied generally normal to the layers and to accommodate torsional loads applied about the common axis, each layer being annular and having a radially inner circumference and a radially outer circumference with respect to the common axis, the improvement wherein at least one of said annular layers of elastomeric material includes at least three concentric rings of elastomer, each ring being contiguous with and bonded to at least one other of said rings and having a modulus of elasticity different from the modulus of elasticity of each of the other rings, the moduli of elasticity of the rings in said at least one layer progressively increasing from ring to ring in a radial direction from one of the circumferences of said at least one layer to the other of the circumferences of said layer.

* * * * *